United States Patent
VanderVelde et al.

(10) Patent No.: US 7,829,797 B2
(45) Date of Patent: Nov. 9, 2010

(54) THREE CHANNEL RACEWAY

(75) Inventors: Charles VanderVelde, Frankfort, IL (US); Randall T. Woods, St. Charles, IL (US); Rodney G. Rouleau, Manhattan, IL (US); Craig A. Zagorski, Lockport, IL (US)

(73) Assignee: Panduit Corp., Tinley Park, IL (US)

( * ) Notice: Subject to any disclaimer, the term of this patent is extended or adjusted under 35 U.S.C. 154(b) by 1020 days.

(21) Appl. No.: 11/252,157

(22) Filed: Oct. 17, 2005

(65) Prior Publication Data

US 2007/0084618 A1 Apr. 19, 2007

(51) Int. Cl.
*H02G 3/08* (2006.01)
(52) U.S. Cl. .................................. 174/481; 174/72 R
(58) Field of Classification Search .................. 174/101, 174/72 R, 68.1, 49, 481, 97
See application file for complete search history.

(56) References Cited

U.S. PATENT DOCUMENTS

| | | | |
|---|---|---|---|
| 2,881,940 A | 4/1959 | Hamilton | |
| 3,592,956 A | 7/1971 | Fork | |
| 3,721,762 A | 3/1973 | Gooding | |
| 3,751,574 A | 8/1973 | Fisher | |
| 4,874,322 A | 10/1989 | Dola et al. | |
| 4,907,767 A * | 3/1990 | Corsi et al. | 248/49 |
| 4,990,722 A | 2/1991 | Navazo | |
| 5,134,250 A | 7/1992 | Caveney et al. | |
| 5,629,496 A | 5/1997 | Navazo | |
| 5,792,992 A * | 8/1998 | Handler | 174/101 |
| 6,323,421 B1 | 11/2001 | Pawson et al. | |
| 6,344,611 B2 | 2/2002 | Ewer et al. | |
| 6,355,880 B1 | 3/2002 | Bateson et al. | |
| 6,576,834 B2 | 6/2003 | Coutant et al. | |
| D498,211 S | 11/2004 | Thibault | |
| 6,903,265 B1 | 6/2005 | VanderVelde et al. | |
| 2002/0088630 A1* | 7/2002 | Benito-Navazo | 174/48 |
| 2003/0089515 A1 | 5/2003 | Federspiel et al. | |

FOREIGN PATENT DOCUMENTS

| | | |
|---|---|---|
| DE | 2 124 163 | 11/1972 |
| EP | 0106535 A2 | 4/1984 |
| GB | 2 174 254 | 10/1986 |

\* cited by examiner

*Primary Examiner*—Ishwarbhai B Patel
(74) *Attorney, Agent, or Firm*—Robert A. McCann; Christopher S. Clancy; Aimee E. McVady (57) ABSTRACT

A raceway system routes power and communication cabling in separate channels but terminates the power and communication cabling in a common center channel. The raceway system includes a base, outer walls and inner walls, one of the outer walls and one of the inner walls define a first outer channel, adjacent inner walls define a center channel and one of the outer walls and one of the inner walls define a second outer channel. The raceway system also includes a plurality of covers connected to the inner and outer walls to cover the channels.

4 Claims, 7 Drawing Sheets

THREE CHANNEL RACEWAY

FIELD OF THE INVENTION

The present invention relates to a raceway for routing cabling, and more particularly to a three channel raceway for routing power and communication cabling through separate channels but terminating the power and communication cabling in a center channel while maintaining power and communication separation throughout the raceway.

BACKGROUND OF THE INVENTION

Typically, power and communication cables are routed and terminated in individual raceway channels to maintain separation of the power and communication cabling. Raceway systems have also routed power and communication cables in individual raceway channels with a third raceway channel being provided to accommodate the power and communication devices as suggested by U.S. Pat. No. 6,323,421. The '421 patent includes a raceway having power and communication channels with divider walls that form a third center channel. Cabling is routed from the power or communication channel to the third center channel by shearing one of the divider walls thereby providing access to the third center channel. As a result, a portion of the power or communication channel is exposed to the third center channel. The '421 patent also includes a cover that is installed over the power channel, the communication channel and the center channel therebetween. When it is necessary to inspect one of the channels, the cover must be removed from all of the channels and disruption of already terminated power and/or data connections occurs. Therefore, it Is desirable to provide an improved raceway system that maintains channel separation of power and communication cabling while providing independent access to each channel throughout the system for easier alterations to the system such as moves, adds and changes.

SUMMARY OF THE INVENTION

The present invention is directed to a raceway system that routes power and communication wires or cables in separate channels while terminating the power and communication wires or cables in a common center channel. The raceway system includes a base and a plurality of walls integrally formed with the base. The plurality of walls include two outer walls and two inner walls. One of the outer walls and one of the inner walls form a first outside channel. The two inner walls form a center channel. The opposite outer wall and inner wall form a second outer channel. The inner walls of the raceway system include a removable section for enabling the power and communication wires or cables to be routed from the first or second outer channel to the center channel. The raceway system also includes a plurality of covers that are connected to the walls to cover the channels and the contents therein.

DETAILED DESCRIPTION

Figure 1:
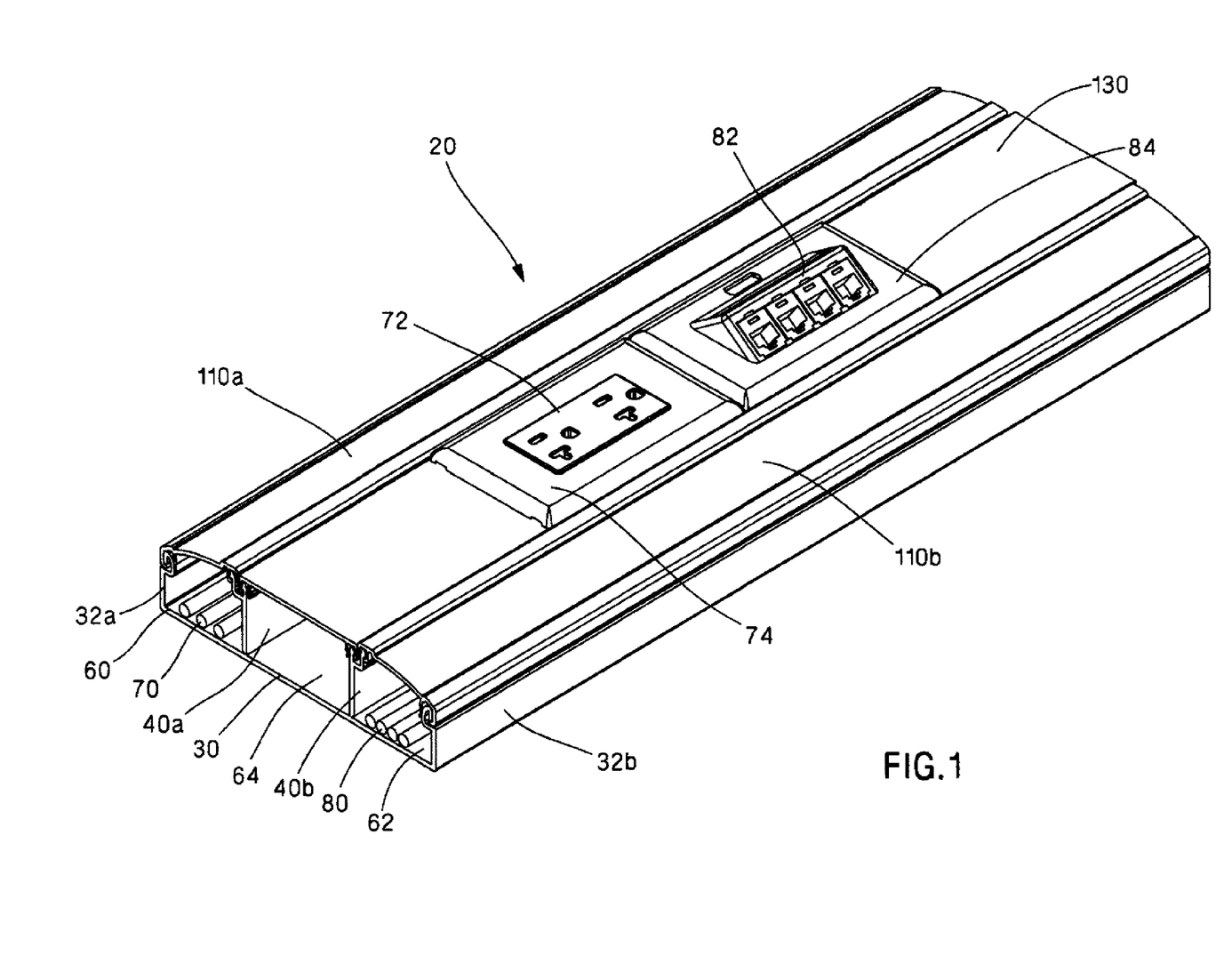
FIG. 1 illustrates a top perspective view of the three channel raceway of the present invention.

FIG. 1 illustrates the three channel raceway 20 of the present invention. The three channel raceway 20 enables the end user to route power and communication cabling 70, 80, respectively, through separate channels 60, 62 of the raceway with both the power and communication cabling being terminated in a center channel 64. As will be discussed below, the three channel raceway maintains power and communication separation throughout the raceway.

Figure 2:
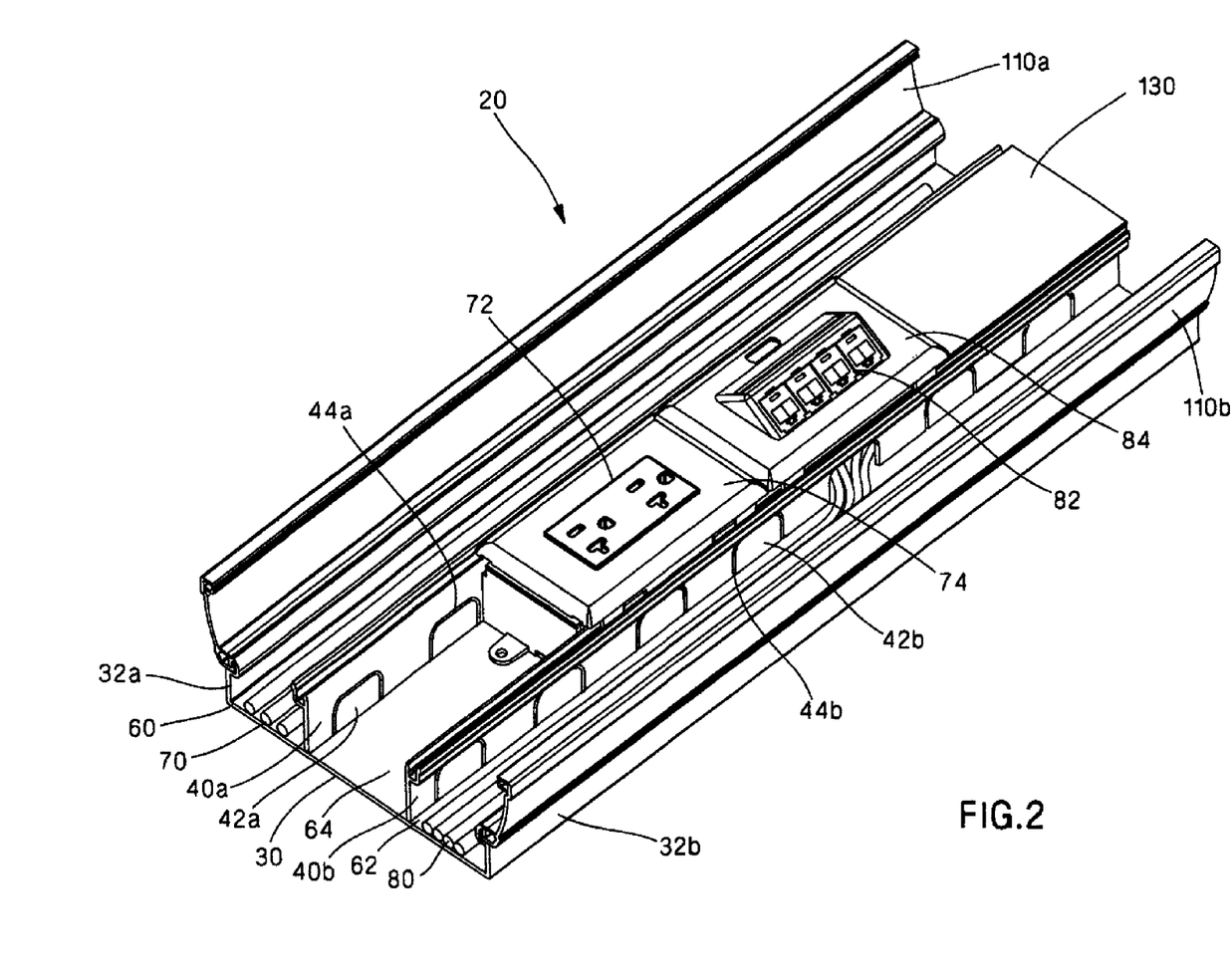
FIG. 2 illustrates a top perspective view of the three channel raceway of FIG. 1 with the cover of the outside channels of the raceway being opened.
Figure 3:
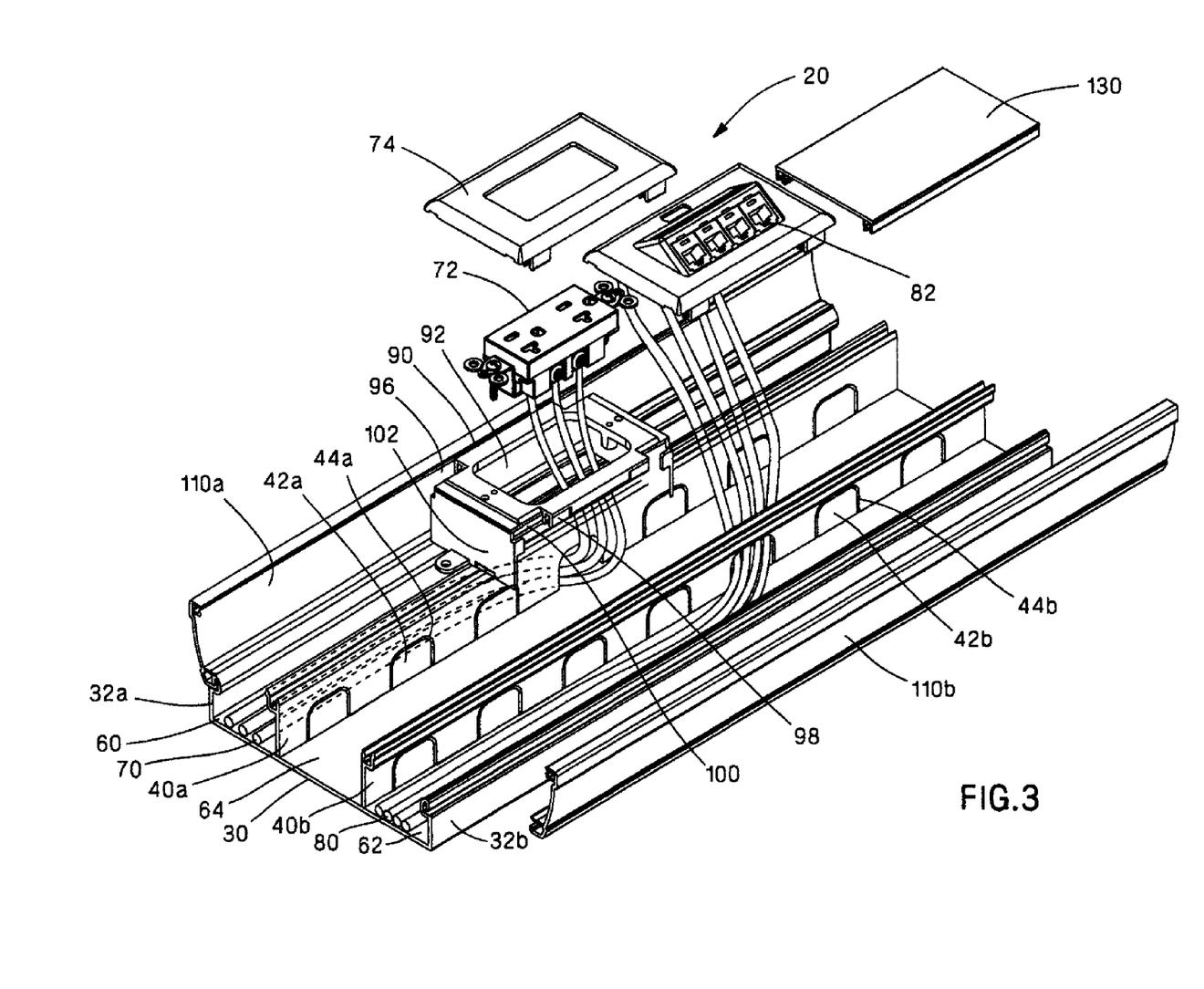
FIG. 3 illustrates an exploded view of the three channel raceway of FIG. 1.

As illustrated in FIGS. 2 and 3, the three channel raceway 20 includes a base 30 with a first vertical outer wall 32a and a second vertical outer wall 32b integrally formed with the base 30. The raceway also includes a first vertical inner wall 40a and a second vertical inner wall 40b integrally formed with the base 30. The first outer wall 32a and the first inner wall 40a define a first outer channel 60 and the second outer wall 32b and the second inner wall 40b define a second outer channel 62. Additionally, the first and second inner walls 40a, 40b define a center channel 64 that houses the power and communication devices in the three channel raceway. The first outer channel 60, second outer channel 62 and center channel 64 extend the length of the raceway.

The first outer channel 60 routes power wires 70 to the power receptacle 72 positioned within the center channel 64 and the second outer channel 62 routes communication cables 80 to the communication module 82 positioned within the center channel 64. As illustrated in FIGS. 1 and 2, a power receptacle 72 with a receptacle faceplate 74 and a communication module 82 with a communication faceplate 84 are installed in the center channel 64 of the raceway. However, any combination of power receptacles 72 or communication modules 82 may be installed in the center channel 64.

Figure 4:
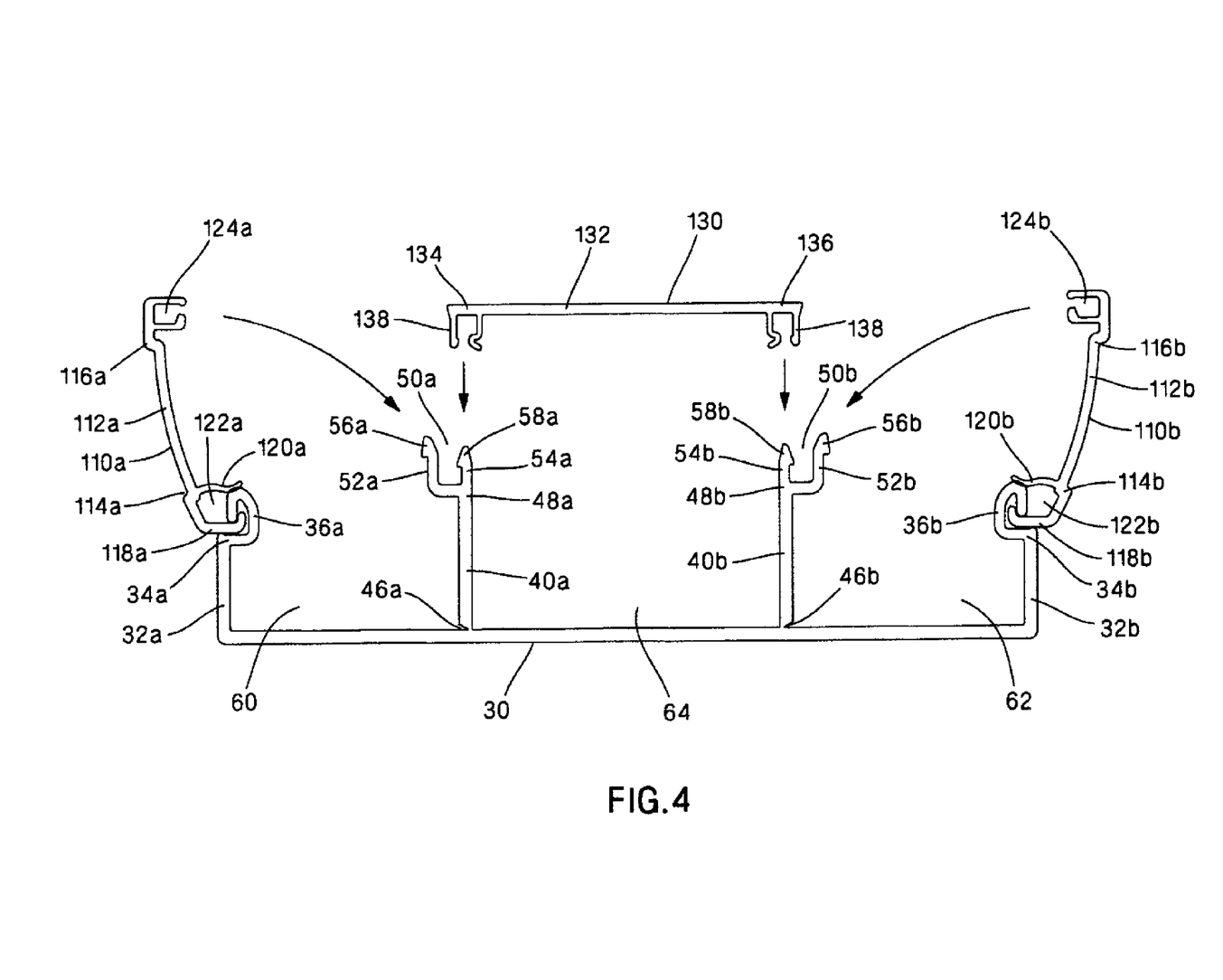
FIG. 4 illustrates a side view of the three channel raceway of FIG. 1 with the covers of each of the channels in an open position.

As shown in FIGS. 2 and 3, the first and second inner walls 40a, 40b of the raceway 20 include a plurality of breakout sections 42a, 42b. The breakout sections 42a, 42b are defined by punched slots 44a, 44b that form a generally rectangular shape. The slots 44a, 44b extend from the bottom of the inner walls 40a, 40b to approximately the center of the inner walls 40a, 40b. Although the breakout sections 42a, 42b have a generally rectangular shape, the breakout sections 42a, 42b may be formed from any shape that would permit the passage of wires or cables. As illustrated in FIG. 4, the inner walls 40a, 40b of the raceway 20 also include an extruded groove 46a, 46b located at the base. Each extruded groove 46a, 46b assists in the removal of the breakout sections 42a, 42b from the inner walls 40a, 40b.

The breakout sections 42a, 42b are removed from the inner walls 40a, 40b of the raceway 20 when it is desirable to route wire or cable from one of the outer channels 60, 62 to one of the devices positioned within the center channel 64. As illustrated in FIG. 3, a breakout section 42a is removed from the first inner wall 40a to route the power wires 70 to the power receptacle 72 and a breakout section 42b is removed from the second inner wall 40b to route the communication cable 80 to the communication modules 82.

FIG. 3 also illustrates a device bracket 90 to be installed in the center channel 64. The device bracket 90 includes an opening 92 for receiving a power receptacle 72, notches 96 for accommodating a receptacle faceplate 74, and sides with downwardly extending latches 98. As described below, the latches 98 enable the device bracket 90 to snap on to the inner walls 40a, 40b of the raceway 20 to secure the device bracket 90 to the center channel 64 of the raceway 20. Each end 100 of the device bracket 90 includes a vertical divider wall 102. The divider walls 102 create a barrier between the power and communication devices and the attached wires or cables in the center channel 64. The attachment area between the divider wall 102 and the end 100 of the device bracket 90 is scored. Therefore, the divider wall 102 may be removed to provide a larger area in the center channel 64 for the wires or cables 70, 80 positioned therein.

Figure 5:
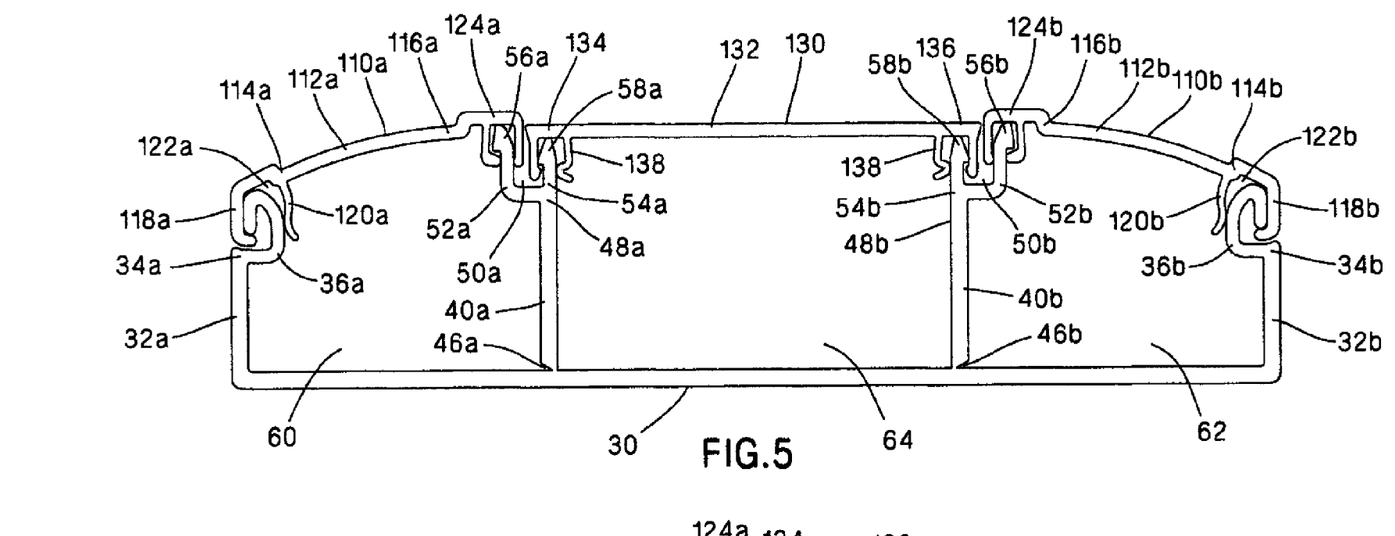
FIG. 5 illustrates a side view of the three channel raceway of FIG. 4 with each cover in a closed position.
Figure 6:
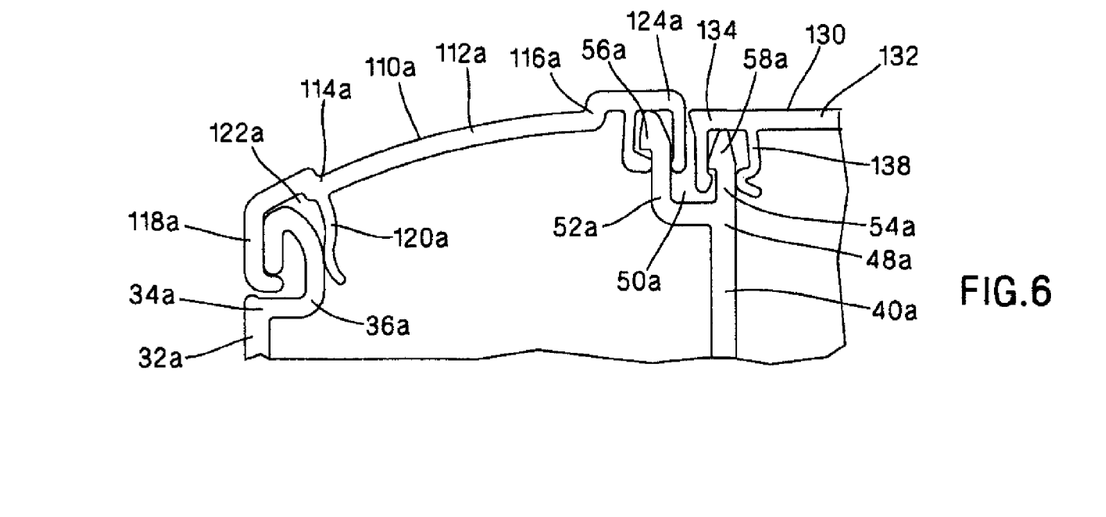
FIG. 6 illustrates a detailed view of the connection of one of the outside covers connected to the first channel and the center cover partially connected to the center channel of the three channel raceway of FIG. 1.

As illustrated in FIG. 4-6, each channel of the three channel raceway is covered by a separate cover. A hinged cover 110a, 110b is connected to each of the outer walls 32a, 32b and a portion of the inner walls 40a, 40b to cover the outer channels 60, 62, respectively, and a removable cover 130 is connected to a portion of each inner wall 40a, 40b to cover the center channel 64.

Each outer wall 32a, 32b of the raceway includes a distal end 34a, 34b with a generally J-shaped hook 36a, 36b. A co-extruded flexible vinyl layer (not illustrated) can be applied to the J-shaped hooks 36a, 36b to prevent the hinged covers 110a, 110b from sliding when the raceway is mounted to a wall in the vertical position. Each inner wall 40a, 40b of the raceway includes a distal end 48a, 48b with a generally U-shaped connector 50a, 50b. Each U-shaped connector 50a, 50b includes a first leg 52a, 52b and a second leg 54a, 54b with an arrowhead located at the end of each leg. The first leg 52a, 52b of each U-shaped connector 50a, 50b extends higher than the second leg 54a, 54b such that arrowhead 56a, 56b of the first leg 52a, 52b is positioned above the arrowhead 58a, 58b of the second leg 54a, 54b.

The hinged covers 110a, 110b include ends that are designed to engage the ends of the inner walls 40a, 40b and the outer walls 32a, 32b, respectively, of the raceway 20. More specifically, each hinged cover 110a, 110b includes a top 112a, 112b, a first end 114a, 114b with a C-shaped hook 118a, 118b, a finger 120a, 120b and a space 122a, 122b therebetween, and a second end 116a, 116b with a generally U-shaped hook 124a, 124b. Each C-shaped hook 118a, 118b engages the inner surface of the J-shaped hooks 36a, 36b at the distal ends 34a, 34b of the outer walls 32a, 32b while each finger 120a, 120b contacts the outer surface of the J-shaped hooks 36a, 36b. The fingers 120a, 120b create a preloaded condition to allow the hinged covers 110a, 110b to smoothly rotate between an opened position away from the outer channels and a closed position covering the outer channels. The connection between the hinged cover and the raceway is disclosed in commonly assigned U.S. Pat. No. 6,903,265, and is herein incorporated by reference.

The generally U-shaped hook 124a, 124b at the second end 116a, 116b of each hinged cover 110a, 110b engages the first leg 52a, 52b of each U-shaped connector 50a, 50b at the distal end 48a, 48b of the inner walls 40a, 40b. As illustrated in FIGS. 5-6, the arrowheads 56a, 56b at the end of the first legs 52a, 52b are disposed within the U-shaped hooks 124a, 124b of the hinged covers 110a, 110b, respectively, to secure the hinged covers to the outer channels of the raceway.

The removable cover 130 includes a top 132 with a first end 134 and a second end 136. The first end 134 and the second end 136 each have a U-shaped latch 138 extending downwardly from the ends 134,136 of the removable cover 130. The U-shaped latches 138 are designed to receive the arrowheads 58a, 58b at the end of the second legs 54a, 54b of the U-shaped hooks 50a, 50b, as shown in FIGS. 5 and 6, to secure the removable cover 130 to the center channel 64 of the raceway. Similarly, the latches 98 extending downwardly from the sides 94 of the device bracket 90 receive the arrowheads 58a, 58b at the end of the second legs 54a, 54b of the U-shaped hooks 50a, 50b to secure the device bracket 90 to the center channel 64 of the raceway.

When the covers are installed over the channels, the U-shaped latches 138 of the removable cover 130 are positioned adjacent to the U-shaped hooks 124 of the hinged covers 110a, 110b. Since the hinged covers 110a, 110b are not connected to the removable cover 130, the removable cover 130 will not disengage when the hinged covers 110a, 110b are rotated to the open position away from the channels. Similarly, the hinged covers will not disengage when the removable cover is removed from the center channel. Thus, each of the covers may be individually removed without disrupting the remaining covered channels and the contents therein.

Figure 7:
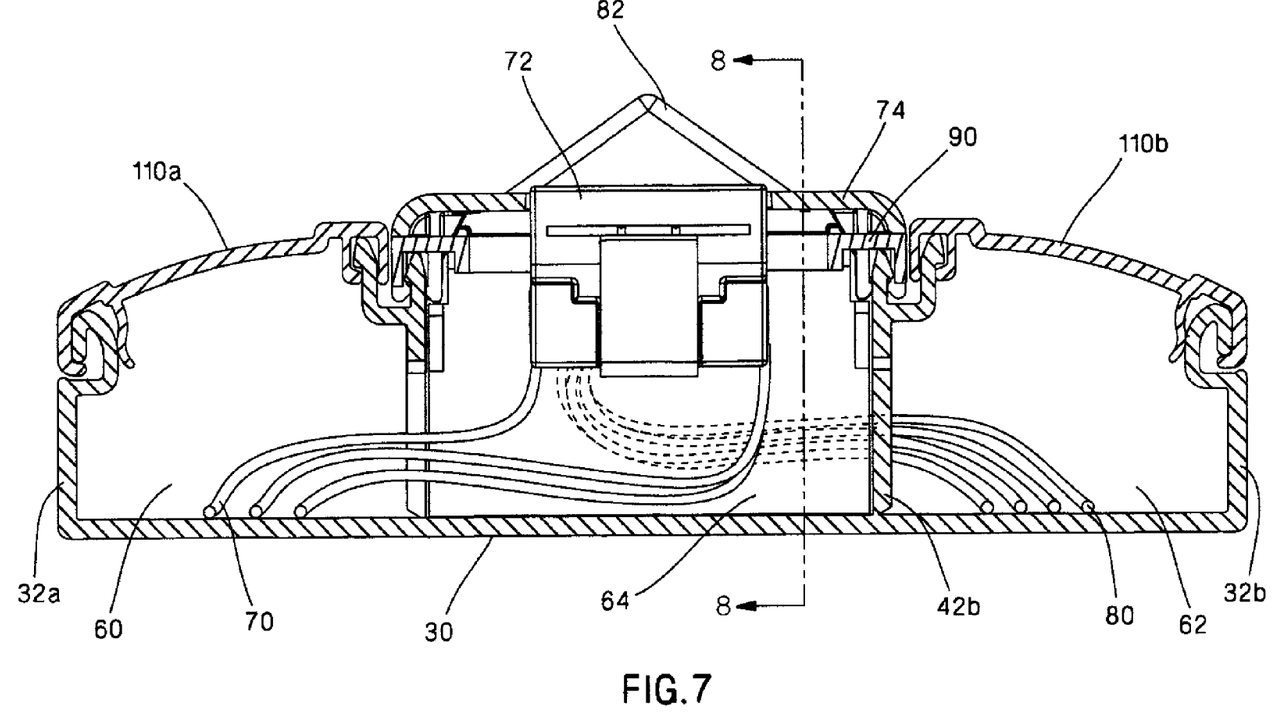
FIG. 7 illustrates a cross sectional view of the three channel raceway of FIG. 1.
Figure 8:
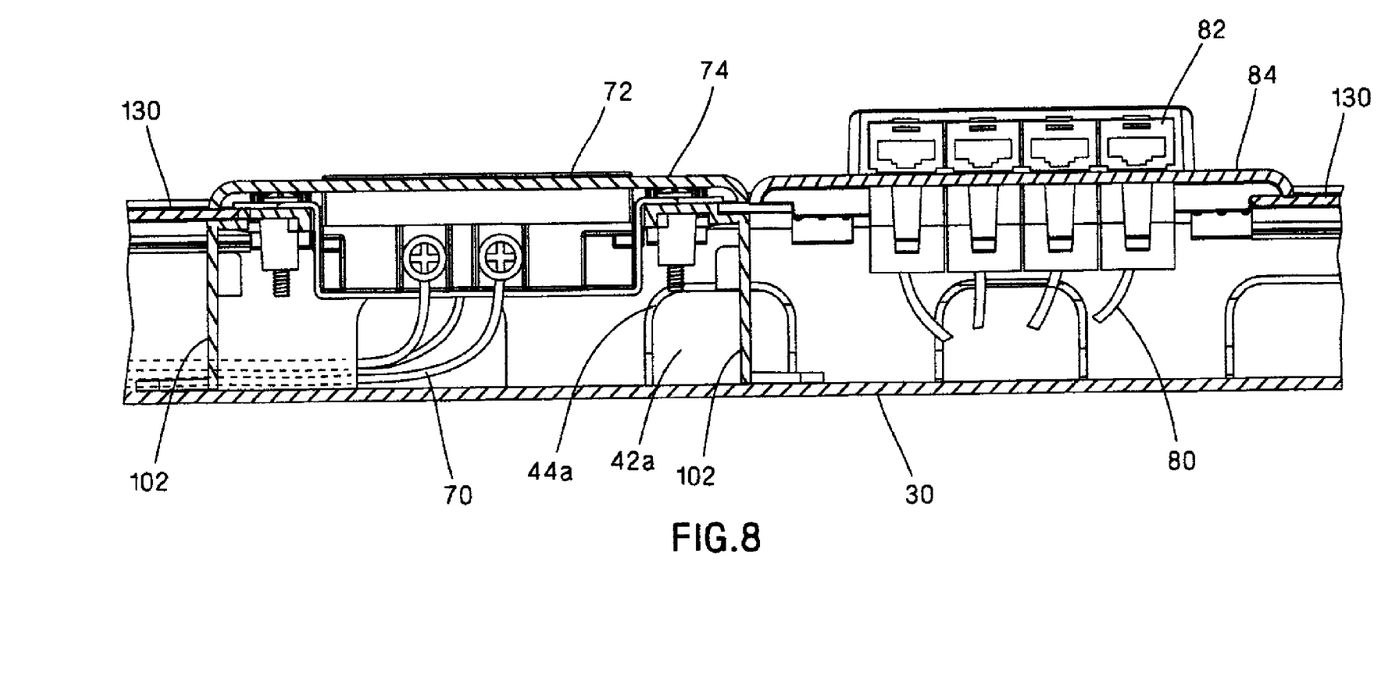
FIG. 8 illustrates a cross sectional view of the three channel raceway taken along line 8-8 of FIG. 7.

FIGS. 7 and 8 illustrate cross sectional views of a device bracket 90 with a power receptacle 72 positioned therein and a communication module 82 installed in the center channel 64 of the raceway. The power wires 70 and communication cables 80 are routed through the first or second channel 60, 62, respectively, and directed to the power receptacle 72 and communication modules 82 in the center channel 64. The vertical divider wall 102 of the device bracket 90 and the inner walls 40a, 40b of the raceway maintain power and communication separation while the power and communication wires and cables are routed to adjacent power and communication devices in the center channel 64. As a result, separation of power and communication is maintained throughout the raceway.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A raceway for routing power and communication cabling in separate channels while terminating the power and communication cabling in a common center channel, the raceway comprising:
   a base;
   a plurality of walls integrally formed with the base, wherein the plurality of walls includes two outer walls and two inner walls, one of the outer walls and one of the inner walls define a first outer channel, the inner walls define a center channel and one of the outer walls and one of the inner walls define a second outer channel; and
   a plurality of covers, wherein one of the covers is individually installed over each channel of the raceway to provide separate access to each channel of the raceway,
   wherein the outer walls include a distal end with a hook and the inner walls include a distal end with a connector having a first leg and a second leg.

2. The raceway of claim 1, wherein the first leg and the second leg include an arrowhead.

3. The raceway of claim 1, wherein the plurality of covers includes hinged covers and a removable cover, the hinged covers include first and second ends, wherein the first end of the hinged covers engages the hook of the outer walls and the second end of the hinged covers engages the first leg of the connectors of the inner walls to cover the outer channels; and the removable cover includes first and second ends, wherein the first and second ends of the removable cover engage the second legs of the connector of the inner walls to cover the center channel.

4. A raceway for routing power and communication cabling in separate channels while terminating the power and communication cabling in a common center channel, the raceway comprising:

a base;

a plurality of walls integrally formed with the base, wherein the plurality of walls includes two outer walls and two inner walls, one of the outer walls and one of the inner walls define a first outer channel, the inner walls define a center channel and one of the outer walls and one of the inner walls define a second outer channel; and a plurality of covers, wherein one of the covers is individually installed over each channel of the raceway to provide separate access to each channel of the raceway, and a device bracket positioned within the center channel, wherein the device bracket includes two ends with a divider wall extending downwardly from each end, whereby the divider walls create a barrier in the center channel to maintain power and communication separation in the center channel.

\* \* \* \* \*